July 21, 1959  W. A. HOLMES-WALKER ET AL  2,895,171
PRODUCTION OF FILMS FROM POLYMERIC MATERIALS
Filed June 11, 1957  2 Sheets-Sheet 1

INVENTORS
WILLIAM ANTHONY HOLMES-WALKER
DENIS JAMES HENRY SANDIFORD

By Cushman, Darby & Cushman
ATTORNEYS

July 21, 1959 W. A. HOLMES-WALKER ET AL 2,895,171
PRODUCTION OF FILMS FROM POLYMERIC MATERIALS
Filed June 11, 1957 2 Sheets-Sheet 2

INVENTORS
WILLIAM ANTHONY HOLMES WALKER
DENIS JAMES HENRY SANDIFORD

BY Cushman, Darby & Cushman
ATTORNEYS

United States Patent Office 2,895,171
Patented July 21, 1959

---

2,895,171

PRODUCTION OF FILMS FROM POLYMERIC MATERIALS

William Anthony Holmes-Walker, Boxmoor, and Denis James Henry Sandiford, Welwyn, England, assignors to Imperial Chemical Industries Limited, Millbank, London, England, a corporation of Great Britain Application June 11, 1957, Serial No. 664,962

Claims priority, application Great Britain March 22, 1957

1 Claim. (Cl. 18—48)

This invention relates to improvements in and relating to the production of films from polymeric materials and more particularly to the production of films from polymers of 3:3-bis-chloromethyl-oxacyclobutane.

Polymers of 3:3-bis-chloromethyl-oxacyclobutante may be prepared as described in British specification No. 723,777 i.e. by contacting 3:3-bis-chloromethyl-oxacyclobutane preferably in the absence of water with a Friedel-Crafts catalyst, especially boron trifluoride or its complexes, or concentrated sulphuric acid, stannic chloride, aluminium chloride, gallium trichloride or a tertiary oxonium salt.

The preparation of polymers of 3:3-bis-chloromethyl-oxacyclobutane is also described in British specification No. 758,450.

British specifications Nos. 723,777 and 758,450 also disclose that polymers of 3:3-bis-chloromethyl-oxacyclobutane are suitable for the production of films and fibres which can be oriented by drawing.

The object of the present invention is to provide a process for the production of improved oriented films from polymers of 3:3-bis-chloromethyl-oxacyclobutane.

According to the present invention we provide a process in which a substantially amorphous, extruded film of a plymer of 3:3-bis-chloromethyl-oxacyclobutane is drawn at a temperature of from 7 to 25° C. to between 2.75 and 7 times its dimension in the direction of drawing before drawing. The drawn film may be subsequently heat set at a temperature between 50 and 150° C.

The process of the present invention is illustrated by reference to the accompanying drawings wherein.

Figure 1:
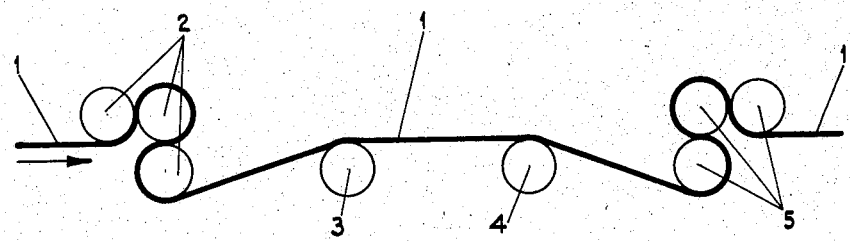
Figure 1 is an elevation of a drawing unit utilized for the present process.

Substantially amorphous, extruded films of polymers of 3:3-bis-chloromethyl-oxacyclobutane suitable for use in the process of this invention may be produced by extruding a thin layer of the molten polymer through a slot orifice and cooling the polymer rapidly after extrusion by jets of cold inert gas, immersion in an inert liquid or by contact with one or more metal surfaces which surfaces are themselves cooled by jets of gas or by the circulation of cooling liquid. The process of this invention may also be applied to film in tubular form made by extruding a polymer of 3:3-bis-chloromethyl-oxacyclobutane in the form of a large diameter tube having thin walls which is cooled rapidly after extrusion by means of inert gas or liquid. The tube may be expanded by internal gas pressure before it is cooled to the solid state in order to avoid the necessity of using very narrow orifices in the extrusion of thin films.

The use of an inert liquid as the cooling medium in the production of films for use in the process of this invention is preferred to the use of a gas as jets of gas tend to distort the film. Water, including refrigerated water and brine, is the preferred cooling medium as it is both cheap and effective. Particularly good results are obtained by the use of water or brine at temperatures in the region of 0° C., e.g. at between —5 and +5° C. Convenient methods which may be used to cool the extruded film are described in British specifications Nos. 719,093 and 741,963.

In the process of the present invention the substantially amorphous, extruded film may be drawn in one direction only but for most applications it is preferred to draw the film in two directions making an angle, preferably a right angle, with each other as a product having a more even balance of properties in various directions may thus be obtained. The film may be drawn in two directions simultaneously or it may be drawn first in one direction and then in the other as consecutive operations.

Suitable temperatures for carrying out drawing operations in accordance with the process of this invention are from 7 to 25° C. The preferred temperature decreases as the rate of extension of the film during drawing increases but normally lies between 12° and 22° C. The film is drawn to between 2.75 and 7 times its dimension in the direction of drawing before drawing. Film having an even balance of particularly good properties in all directions is obtained by drawing the film in two directions at right angles until its dimension in each of the two directions has been increased 2.75 to 5 times, particularly 2.75 to 3.5 times.

For some applications it is desirable for the film to have a tensile strength in one direction that is high in comparison with the strength of a similar film having an even balance of properties in all directions, and at the same time to have adequate tensile strength in the direction at right angles to the direction of higher tensile strength. A film having a higher strength in one direction may be produced by drawing the film to orient it in one direction only, or by drawing the film in two directions at right angles the extent of drawing in one direction being higher than in the other. The first of these methods gives film that is suitable for certain applications but which tends to have unsatisfactory properties in the direction at right angles to the direction of drawing, the film being brittle and having a tendency to fibrillate when handled. The second method also has a disadvantage in that if the film is drawn first in the direction of the higher draw ratio it is liable to split when an attempt is made to draw it in a direction at right angles, or if the film is drawn in the direction of the lower draw ratio the second drawing operation tends to be unstable and to produce film with wide thickness variations. These difficulties may be overcome by drawing the film to an equal extent in two directions at right angles and then subjecting the film to a further drawing in one of these directions. In this way a high tensile strength is introduced into the film in the direction in which it has been twice drawn, and whilst there is some loss of tensile strength in the direction at right angles thereto, sufficient remains to give the film adequate properties in this direction. In the production of film of this type, the first two drawing operations may be carried out simultaneously or consecutively. When they are carried out consecutively, it is preferred to draw the film first in the direction in which the greater tensile strength is desired in the finished film. The final drawing operation is preferably carried out at a somewhat higher temperature than the earlier drawing operations.

The substantially amorphous, extruded film may be drawn longitudinally in the process of this invention by passing it between or round a pair or series of slow rolls and then between or round a pair or series of fast rolls. If drawing is to be effected at other than room temperature, the slow rolls may be heated or cooled to the desired drawing temperature. Elevated drawing temperatures may also be achieved by contacting the film with a roller heated to the desired drawing temperature and positioned between the slow and fast rolls. After it has passed through the drawing region the film is then preferably cooled rapidly by contacting it with a cooling roller before it is passed to the fast rolls. The cooling roller is maintained at room termperature or below, this being most conveniently achieved by circulation of a cooling liquid, e.g. iced water or brine.

A useful alternative method of heating the film to an elevated temperature for drawing is by means of radiant heat applied to as small a length of film, in the desired drawing region, as is consistent with the need to heat the film to the desired drawing temperature.

Flat, as opposed to tubular, film may conveniently be drawn in the transverse direction by gripping each of the margins of the film between a grooved, rotating pulley and an endless belt which cooperates with the groove over a part of the periphery of the pulley, the two pulleys being disposed at an angle to each other so that the distance between the margins of the film increases as the pulleys rotate. Flat films can also be drawn laterally by means of stenters. Tubular films are most conveniently drawn transversely by inflating them under the influence of internal gas pressure, e.g. by the methods described in British specification No. 741,962 and in the specification of British application No. 15940/55 (U.S. Serial No. 585,795 now Patent No. 2,862,234).

Drawn films produced by the process of the present invention are preferably heat set as this increases their tensile yield stress and also the temperature to which they may be heated without shrinkage becoming serious. Suitable heat setting temperatures are between 50° and 150° C. The film is preferably kept under sufficient tension during heat setting to prevent any retraction in its dimensions. This may be achieved for flat film by means for example of a stenter. For tubular film, it may be achieved for example in equipment as described in the specification of British application No. 23324/54. The film may be heated during the heat setting step by any suitable means, e.g. by radiant or infra-red heaters, by heated gas in an oven, or by contact with a heated surface.

Polymers of 3:3-bis-chloromethyl-oxacyclobutane used in the production of films according to the present invention preferably have a molecular weight of at least 10,000 as films having particularly good properties are then obtained.

The films produced by the process of this invention are strong, e.g. films can be produced having a tensile yield strength of 20° C. of the order of 10,000 lb./sq. inch and higher as measured at a strain rate of 30%/sec. They are also very resistant to hydrolysis. A further valuable property of these films is that they can be heat-sealed, i.e. they can be welded together when in a heat-softened state by the application of pressure. These properties render films produced by the process of this invention very suitable for use as wrapping materials for foodstuffs, pharmaceuticals, cosmetics, machine parts, etc. Such films are also very suitable for providing electrical insulation, for use as dielectrics, and for use in the production of shower-proof and chemical resisting curtains and rainproof and chemical resisting clothing, e.g. hoods, capes and aprons. They may be formed into laminates with other materials. Thus, solutions of film-forming organic materials may be spread on them and the solvent removed by evaporation. Metal films may also be formed on them by methods such as vacuum metallising, chemical reduction, electrostatic spraying or electroplating over an electrically-conducting layer. Such metal coated films may be used for electrical purposes for example for producing condensers, or they may be used for example, as wrapping film or for decorative purposes.

Our invention is illustrated but not limited by the following examples.

*Example 1*

Poly 3:3-bis-chloromethyl-oxacyclobutane of melt viscosity $3 \times 10^4$ poises measured at 250° C. under a shear stress of $4 \times 10^5$ dynes/sq. cm. was extruded as a film 7 inches wide using a 1½ inch Iddon extruder. The temperatures of the various parts of the extruder were as follows.

| | ° C. |
|---|---|
| Barrel | 230 |
| Extrusion head | 250 |
| Die lips | 280 |

The extruded film was quenched in a bath containing iced water at a temperature between 0 and 5° C. The quenched film was hauled off between nip rolls in the quenching bath and fed therefrom to the slow rolls of a forward drawing unit at a speed of 5 feet/minute.

An elevation of the forward drawing unit is shown in Figure 1 of the accompanying drawings. In this figure, the film is represented by 1 and moves in the direction indicated by the arrow. The slow rolls are represented by 2.

After leaving the slow rolls the film was passed over a water heated roll, 3, at 17° C. and after drawing was immediately quenched by passing over a roll, 4, cooled by brine at −10° C. before it was fed to the fast rolls, 5. The film was drawn to a ratio of 6:1.

The resulting film showed a tensile yield strength at 20° C. of 2,000 p.s.i. in both the forward and transverse directions as measured at a strain rate of 30%/sec. The film was then allowed to crystallise for 16 hours at room temperature. After this time the yield strength had risen to 50,000 p.s.i. in the forward direction and 3,000 p.s.i. in the transverse direction.

*Example 2*

Flat amorphous poly 3:3-bis-chloromethyl-oxacyclobutane film was produced as described in Example 1 and fed at a speed of 5 ft./min, to a forward drawing unit similar to that described in Example 1. The film was drawn at a temperature of 17° C. to a ratio of 3½:1 and was immediately quenched as in Example 1.

The drawn film was stored at −10° C. It was then allowed to warm up to 5° C. and fed immediately to a sideways drawing unit. In this unit each of the margins of the film was gripped between a grooved, rotating, pulley and an endless belt which cooperated with the groove over a part of the periphery of the pulley, the two pulleys being disposed at an angle to the other, so that the distance between the margins of the film increased as the pulleys rotated. The pulleys were partially immersed in a bath of water at a temperature of 15° C. and were rotated at a peripheral speed of 10 ft./min. The film was thus drawn laterally to a ratio of 3½:1.

Figure 2:
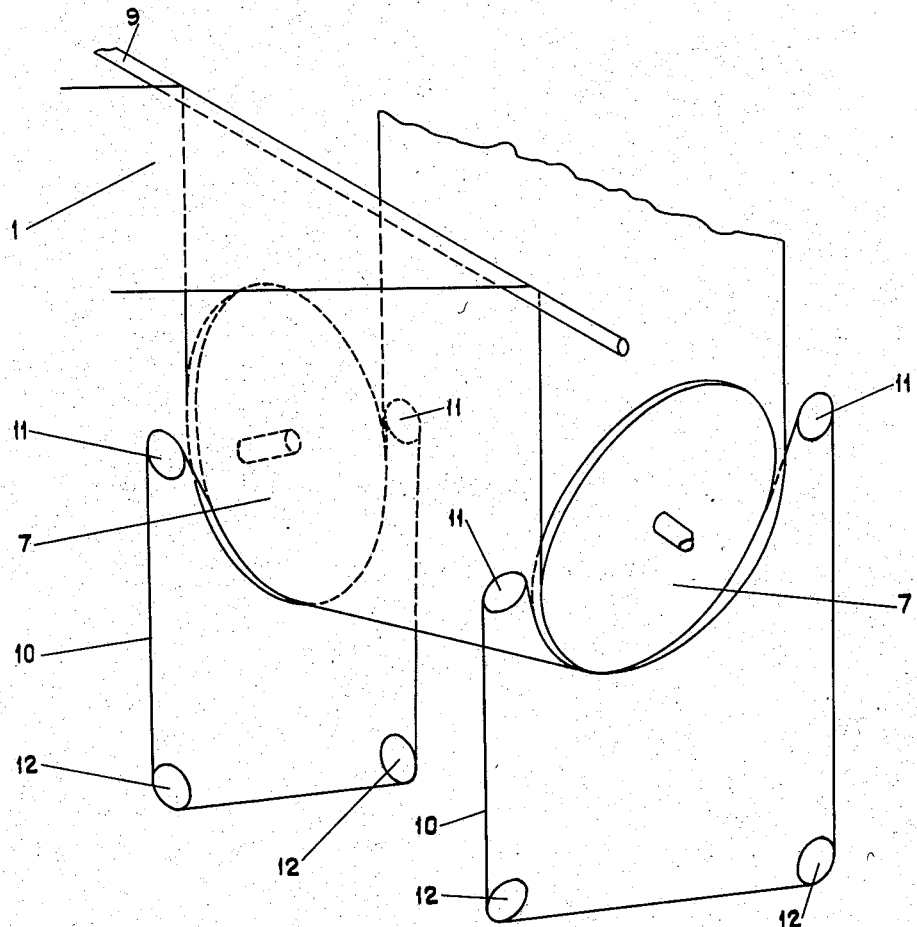
Figure 2 is a general view of further drawing means used in the present invention.

A general view of the sideways drawing unit, with the bath removed, is shown in Figure 2. The film 1 passed over a roller 9 and its edges were subsequently gripped between the grooved rotating pulleys 7 and the endless belts 10. The endless belts 10 were each supported on two pulleys 11. A suitable tension in the endless belts was achieved by means of the pulleys 12, the position of which was capable of adjustment in the vertical direction.

Figure 3:
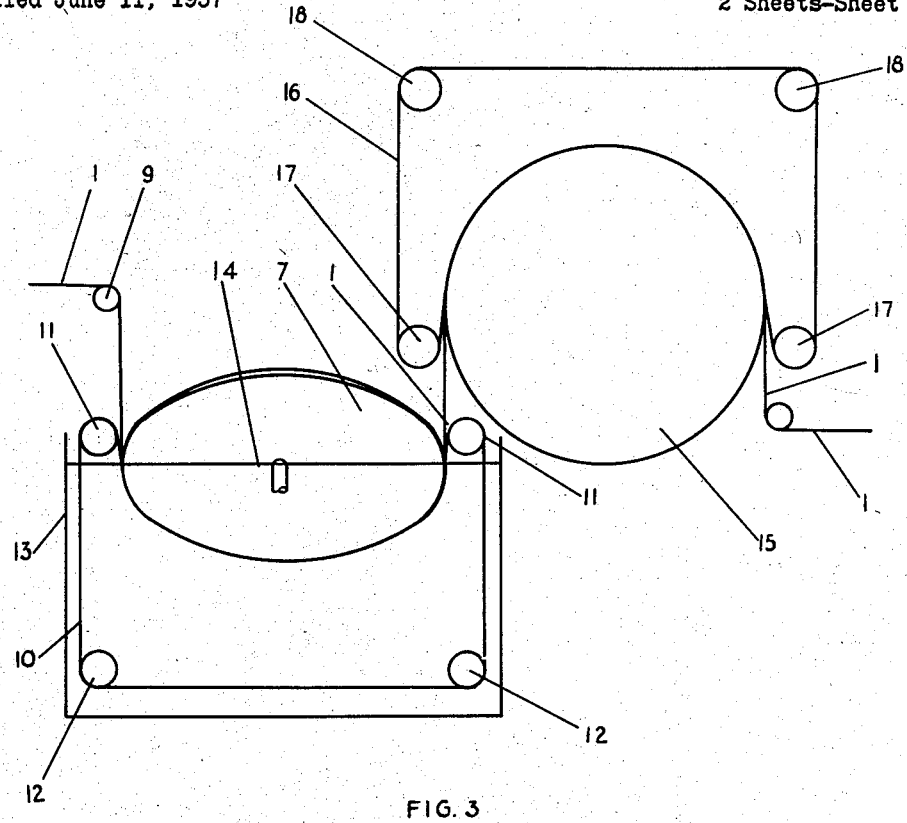
Figure 3 is a side view of drawing means and associated parts.

After leaving the sideways drawing unit, the biaxially drawn film was heat set at 70° C. for 15 seconds. This was achieved by passing the film over a heated drum. A side view of the drum and of the sideways drawing unit is shown in Figure 3 of the accompanying drawings. In this figure, the numerals 1, 7, 10, 11 and 12 have the same significance as in Figure 2. In addition, 13 represents the bath in which the sideways drawing was carried out, the level of the water in this bath being represented by 14. The heated drum used for the heat-setting step is represented by 15. This drum was heated by gas burners inside the drum. The drum had two circumferential grooves, one near each end, situated a short way in from the outside edge of the film. Two endless belts 16 (one only shown) cooperated with this groove over approximately half the circumference of the drum. The endless belts 16 passed round pulleys 17 and 18 and a suitable tension in them was achieved by adjusting the position of pulleys 18 in a vertical direction. The margins of the film were gripped between the endless belts and the drum and retraction in the dimensions of the film during heat setting thus prevented.

Figure 4:
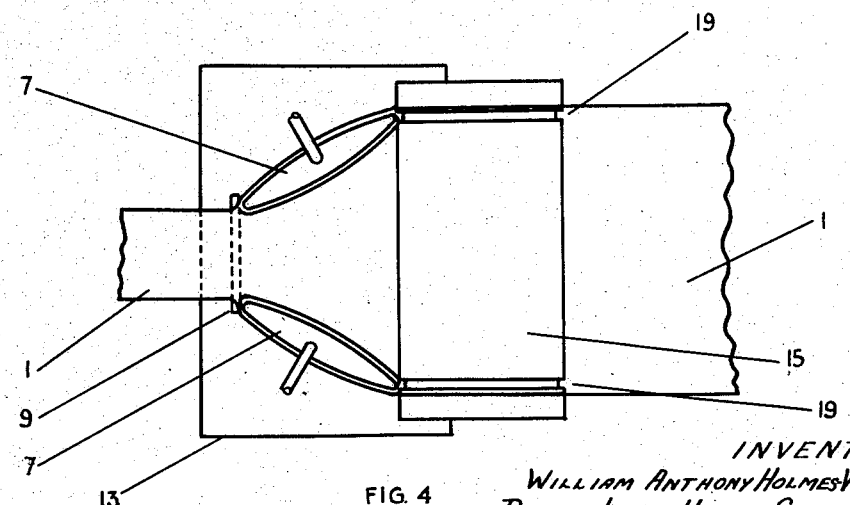
Figure 4 is a plan view of the drawing means illustrated in Figure 3.

A plan view of the sideways drawing unit and the heat-setting unit is shown in Figure 4. The numerals in this figure have the same significance as in Figure 3. In Figure 4, the pulleys 11, 12, 17 and 18 and the endless belts 10 and 12 have been omitted. The grooves in the drum 15 with which the endless belts 16 cooperated are shown in Figure 4 represented by 19.

The heat set film produced as described above had equal mechanical properties in all directions and a tensile yield strength at 20° C. of 8,700 p.s.i. as measured at a strain rate of 30%/sec.

*Example 3*

The process of Example 2 was repeated, except that the film was heat set for 5 minutes in an oven at 100° C. The film was kept under tension during the heat-setting step to prevent retraction in its dimensions. The resulting film had equal mechanical properties in all directions and tensile yield strength at 20° C. of 10,700 p.s.i. as measured at a strain rate of 30%/sec.

We claim:

A process for the production of an oriented film from a polymer of 3:3-bis-chloromethyloxacyclobutane which comprises melting a polymer of 3:3-bis-chloromethyloxacyclobutane having a molecular weight of at least 10,000; extruding said molten polymer as a film and quenching the same in water at a temperature between —5° and +5° C., to obtain a substantially amorphous, extruded film; first drawing said substantially amorphous, extruded film in one direction to between 2.75 and 3.5 times its original dimension in the direction of drawing; thereafter drawing said film a second time in another direction at right angles to the direction in which said film was first drawn, to between 2.75 and 3.5 times its dimension in the direction of said second drawing; further drawing said film in the direction in which said film was first drawn, each of said drawing steps being carried out at a temperature between 12 and 22° C.; and heat setting said film, after drawing, at a temperature between 50 and 150° C., while preventing retraction of said film.

References Cited in the file of this patent

UNITED STATES PATENTS

| | | |
|---|---|---|
| 2,161,766 | Rugeley et al. | June 6, 1939 |
| 2,233,442 | Wiley | Mar. 4, 1941 |
| 2,309,370 | Williams | Jan. 26, 1943 |
| 2,412,187 | Wiley et al. | Dec. 3, 1946 |
| 2,497,376 | Swallow et al. | Feb. 14, 1950 |
| 2,618,012 | Milne | Nov. 18, 1952 |
| 2,722,492 | Ralston | Nov. 1, 1955 |
| 2,722,520 | Hulse | Nov. 1, 1955 |
| 2,767,435 | Alles | Oct. 23, 1956 |

FOREIGN PATENTS

| | | |
|---|---|---|
| 758,450 | Great Britain | Oct. 3, 1956 |